G. A. CARLSON.
PENCIL HOLDER, ETC.
APPLICATION FILED FEB. 19, 1921.
1,408,863.
Patented Mar. 7, 1922.
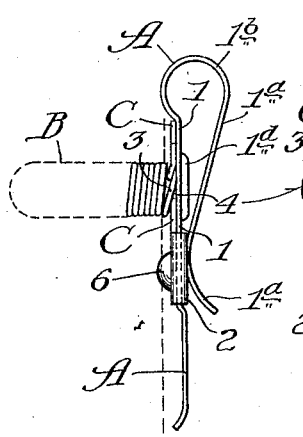
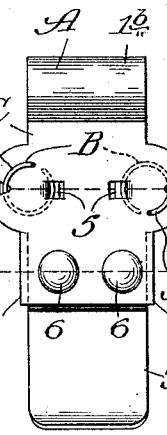
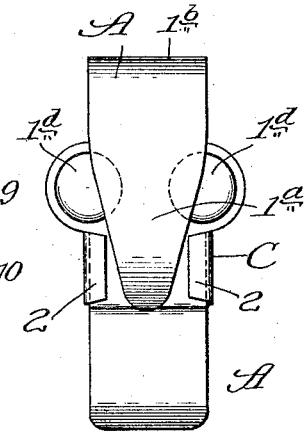
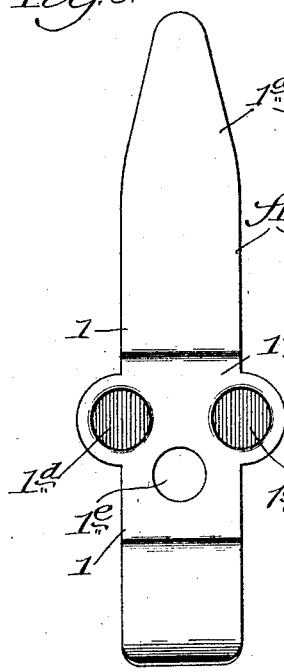
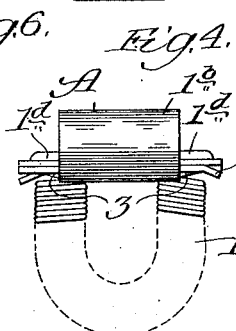
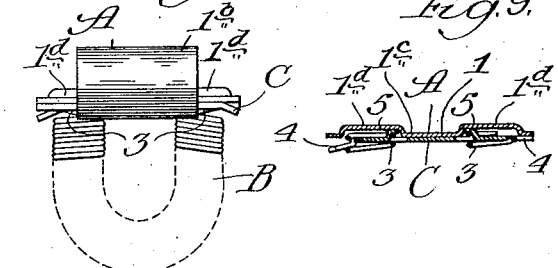
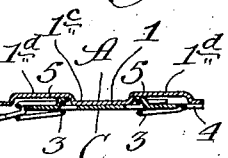
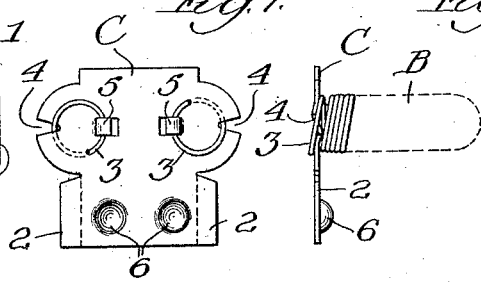
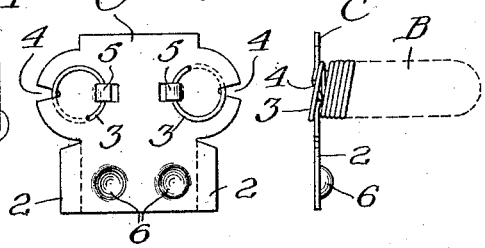
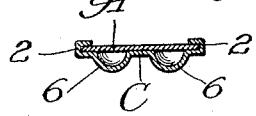
Inventor:
Gustav A. Carlson,
By Dyrenforth, Lee, Chritton & Wiles,
Att'ys

UNITED STATES PATENT OFFICE.

GUSTAV A. CARLSON, OF CHICAGO, ILLINOIS, ASSIGNOR TO THE BOYE NEEDLE COMPANY, OF CHICAGO, ILLINOIS, A CORPORATION OF ILLINOIS.

PENCIL HOLDER, ETC.

1,408,863.　　　　Specification of Letters Patent.　　Patented Mar. 7, 1922.

Application filed February 19, 1921. Serial No. 446,267.

*To all whom it may concern:*

Be it known that I, GUSTAV A. CARLSON, a citizen of the United States, residing at Chicago, in the county of Cook and State of Illinois, have invented a new and useful Improvement in Pencil-Holders, Etc., of which the following is a specification.

The present invention relates to holders for pencils, fountain-pens, etc.; and the primary object is to provide an improved holder of this character which can be cheaply manufactured.

The invention is illustrated in its preferred embodiment in the accompanying drawing, in which—

Figure 1 represents an edge elevational view of the improved pencil-holder; Fig. 2, a section taken as indicated at line 2 of Fig. 1; Fig. 3, an elevational view, viewing the device from the opposite side; Fig. 4, a plan view of the device; Fig. 5, a view of the blank from which the pocket-engaging clip is formed; Fig. 6, an edge view of the blank; Fig. 7, a view of a coil-attaching plate employed; Fig. 8, an edge view of the same, showing the coil connected therewith; Fig. 9, a section taken as indicated at line 9 of Fig. 2; and Fig. 10, a section taken as indicated at line 10 of Fig. 2.

The improved pencil clip comprises a pocket-engaging clip A; a resilient loop or coil B; and a coil-attaching plate C.

The clip A is formed from the blank shown in Figs. 5 and 6. It has the vertical shank portion 1 which is adapted to extend into the pocket of a garment, and a resilient tongue $1^a$ connected with the upper portion of the part 1 by a spring-loop $1^b$. The shank portion 1 is provided with a bearing portion $1^c$ for receiving the plate C. The portion $1^c$ has a pair of lateral projections with the metal struck rearwardly to form embossments $1^d$. The portion $1^c$ is further provided below the embossments $1^d$ with a perforation or recess $1^e$.

The resilient loop B comprises a coil spring which is bent into U-form and has its ends secured to the attaching plate C. The plate C fits in the seat $1^c$, and has lateral flanges 2 which are bent over the lateral edges of the shank 1 to hold the parts together. Before this assembling operation is performed, the resilient loop B is secured to the plate C. This is accomplished by abutting the ends of the coil against one side of the plate C and passing the end convolutions 3 of the coil through lateral notches 4 with which the plate C is provided. The end convolutions of the coil are then secured to the back of the plate by means of lugs 5 which are struck from the plate and clenched over the end convolutions. When the plate C is secured in the socket $1^c$ of the shank 1, the end convolutions 3 of the coil are received in the recesses afforded by the embossments $1^d$. Thus, the end convolutions of the coil are confined between the plate C and the shank-portion $1^c$ of the member A.

The plate C is provided with small embossments 6 which flank the vertical axle of the plate and form between them a guide which is adapted to center the pencil inserted through the resilient loop B.

In the use of the improved device, the shank 1 carrying the resilient loop B is inserted inside the pocket, and the resilient tongue $1^a$ engages the outer side of the pocket. The loop B projects at right angles from the shank 1 and is firmly anchored to said shank. The loop is capable of expanding the necessary amount to admit the pencil or pen as the case may be. The method of anchoring the loop to the shank provides substantial flat ends which bear against the back surface of the shank 1, while the end convolutions of the coil embrace the opposite or inner side of the plate C and are firmly confined between the plate C and the shank 1. Thus, the loop is quite strongly held in a plane at right angles to the plane of the shank 1. When a pencil is inserted in the pocket through the loop B, it engages between the embossments 6 below the loop, so that the pencil is thus held from swinging in the plane of the pocket. The construction provides for the easy insertion of a pencil, and the inserting operation can be accomplished without the necessity of supporting the loop B by means of the fingers.

The improved construction can be cheaply manufactured, and is admirably adapted to its purpose. The construction does not require the use of a special form of coiled wire. An ordinary coil of steel wire of round cross section may be employed.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. A pencil clip comprising a supporting member and a resilient loop comprising a U-form wire coil having end portions perpendicular to the supporting member and abutting against and anchored to the supporting member.

2. A pencil clip comprising a supporting member, an attaching plate secured thereto, and a resilient loop comprising a U-form wire coil having end portions perpendicular and abutting against the attaching plate and having end convolutions extending back of the attaching plate and confined between the same and the supporting member.

3. A pencil clip comprising a supporting member, an attaching plate provided with lateral notches, a resilient loop comprising a U-form wire coil having end portions abutting against the attaching plate and having end convolutions extending through said lateral notches and confined between the attaching plate and supporting member, and means securing said attaching plate to said supporting member.

4. A pencil clip comprising a pocket-engaging clip equipped on one side with a resilient pocket-engaging tongue, said clip having its shank portion provided with embossments struck towards said tongue and affording on the opposite side depressions, an attaching plate secured to said shank portion, and a resilient loop comprising a U-form wire coil having end portions abutting against one surface of the attaching plate and having end convolutions extending between the attaching plate and said shank and confined in said depressions.

5. A device of the character set forth comprising a pocket-engaging clip, a resilient loop secured at one side thereof, and projections on said clip disposed on opposite sides of the vertical axis of the clip and serving as a means for centering a pencil inserted through said loop.

6. A device of the character set forth comprising a pocket-engaging clip, a U-form wire coil having its ends anchored to said clip, and projections on said clip below said coil, said projections being disposed on opposite sides of the axis of the clip and serving as means for guiding a pencil inserted through said coil.

GUSTAV A. CARLSON.